Figure 1:
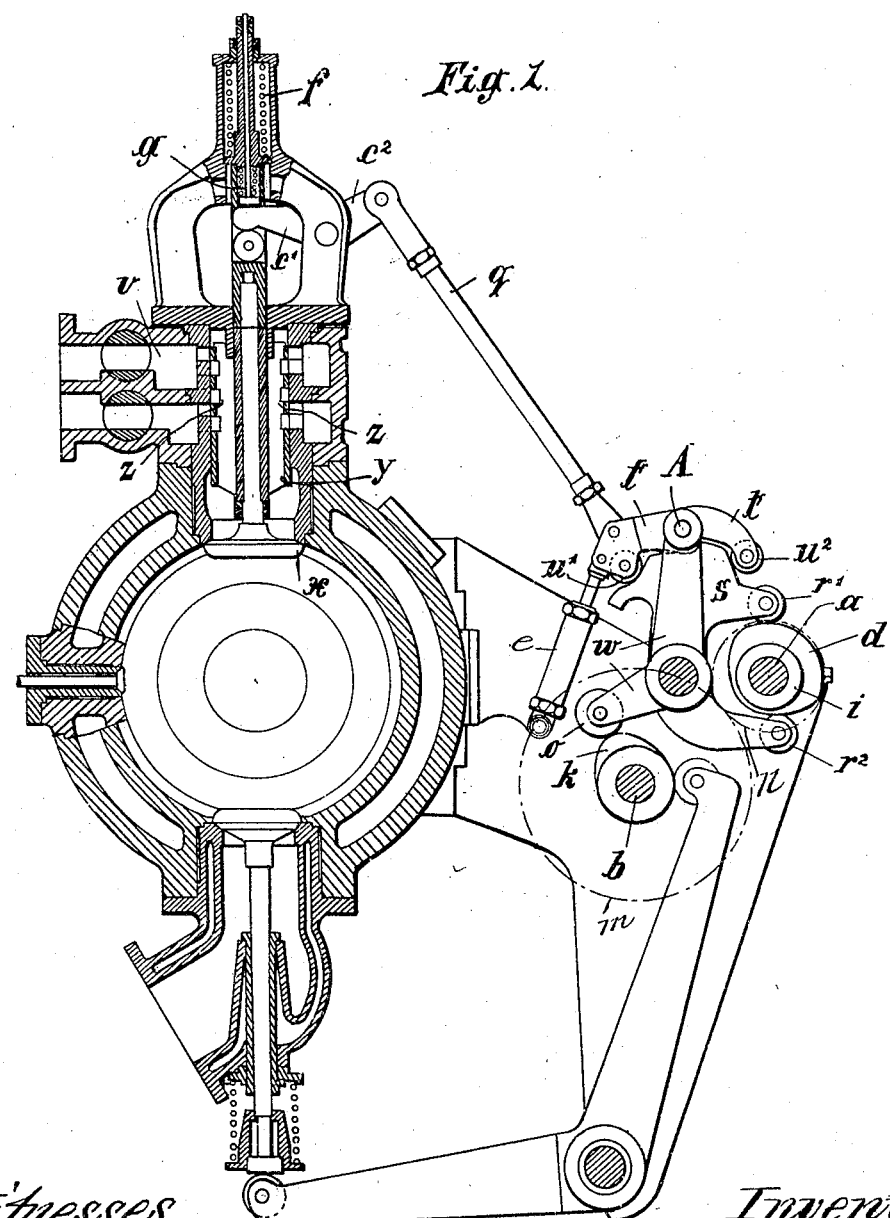

No. 852,272. PATENTED APR. 30, 1907.
R. HENNIG.
GOVERNING MEANS FOR INTERNAL COMBUSTION ENGINES.
APPLICATION FILED MAR. 3, 1904.

6 SHEETS—SHEET 1.

Witnesses.

Inventor.
Rudolf Hennig.

No. 852,272.

PATENTED APR. 30, 1907.

R. HENNIG.
GOVERNING MEANS FOR INTERNAL COMBUSTION ENGINES.
APPLICATION FILED MAR. 3, 1904.

6 SHEETS—SHEET 4.

Witnesses
E. E. Weaver
C. F. Kesler

Inventor
Rudolf Hennig
By
James L. Norris
Atty.

No. 852,272. PATENTED APR. 30, 1907.
R. HENNIG.
GOVERNING MEANS FOR INTERNAL COMBUSTION ENGINES.
APPLICATION FILED MAR. 3, 1904.

6 SHEETS—SHEET 5.

Witnesses:
E. E. Weaver
G. D. Kesler

Inventor
Rudolf Hennig
By
James L. Norris.
Atty.

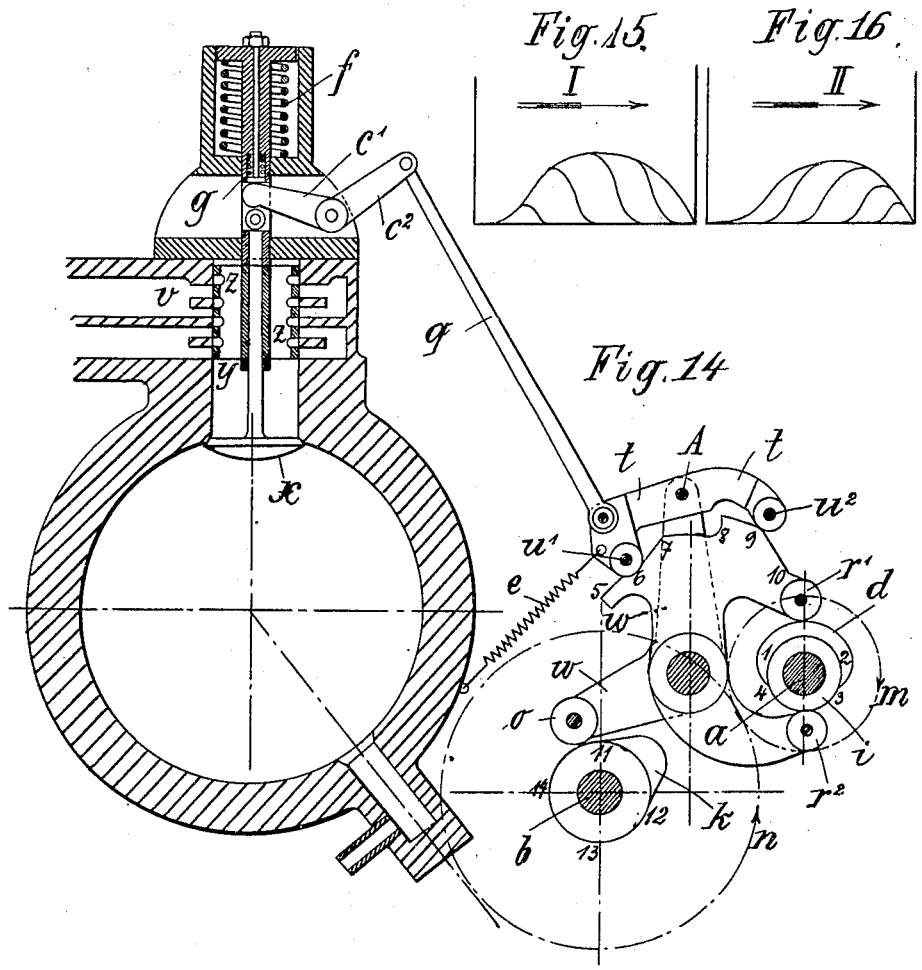

UNITED STATES PATENT OFFICE.

RUDOLF HENNIG, OF ZWEIBRÜCKEN, GERMANY.

GOVERNING MEANS FOR INTERNAL-COMBUSTION ENGINES.

No. 852,272.  Specification of Letters Patent.  Patented April 30, 1907.

Application filed March 3, 1904. Serial No. 196,391.

*To all whom it may concern:*

Be it known that I, RUDOLF HENNIG, a subject of the Emperor of Germany, residing at Zweibrücken, Pfalz, Bavaria, Germany, have invented certain new and useful Improvements Relating to the Governing Means for Internal-Combustion Engines, of which the following is a specification.

This invention relates to a valve-gear whereby the admission valve of four-stroke-cycle explosion engines can be actuated in such a manner that it either opens at a constant or definite point in the travel of the piston and closes at a variable point in the travel of the piston, or opens at a variable point in the travel of the piston and closes at a constant point, for the purpose of governing the engine by varying the quantity of explosive mixture entering the cylinder and of improving the said mixture so as to obtain the best ignition. If now the exhaust valve of the engine opens at a constant point in the travel of the piston and closes at a constant point before the opening of the admission valve, there plainly remains in the compression space a constant quantity of exhaust gases from the previous stroke. According to the first alternative method of governing, when the exhaust valve closes at the dead point and the admission valve opens at the same place, with the slightest possible depression in the atmospheric pressure there is a variable quantity of the explosive mixture to the constant quantity of exhaust gases in the compression chamber or space. According to the second alternative method of governing, the admission valve, after the exhaust valve is closed at the dead point, in the first place likewise remains closed. The exhaust gases from the compression chamber expand alone and thus produce a partial vacuum in the cylinder, which is greater the later the admission valve opens in the outward motion of the piston. The explosive mixture will be mixed so much the more intimately the greater the partial vacuum in the cylinder and consequently the greater its velocity of entrance. Since the quantity of the explosive mixture necessarily decreases when the admission valve opens later, the most uniform mixture possible is produced, this being more especially the case with small charges and by this means very perfect combustion is obtained. In both cases (alternative methods of governing), the operations can be controlled during the admission of the explosive mixture in the most varied manner by means of the valve gearing.

Figure 2:
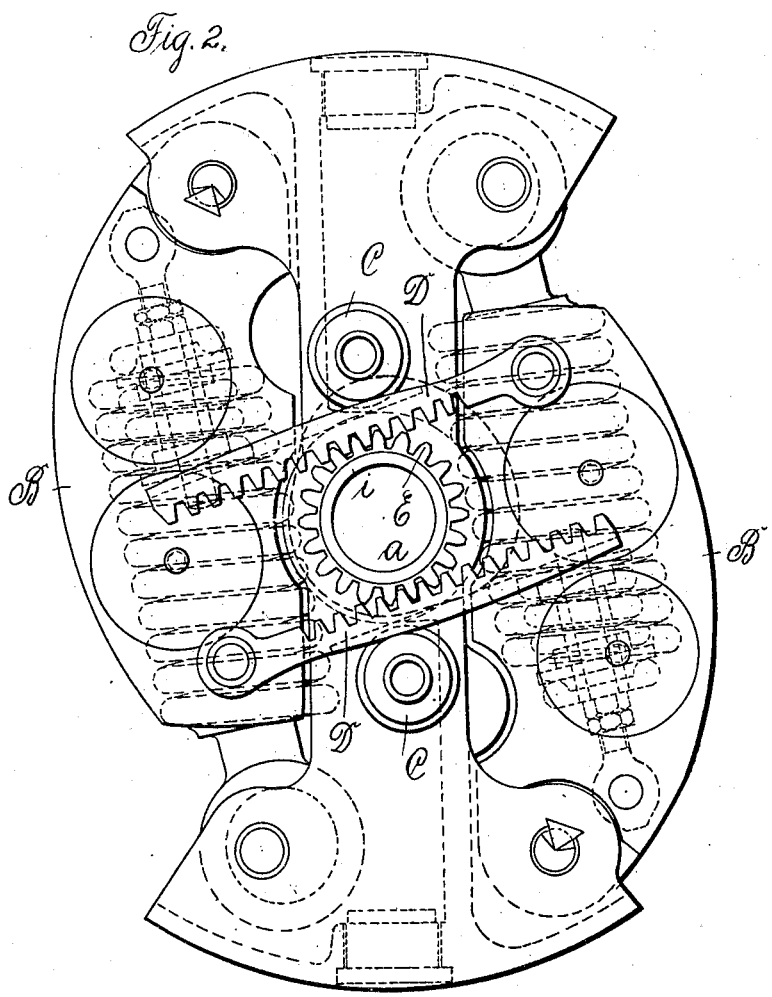
Figure 3:
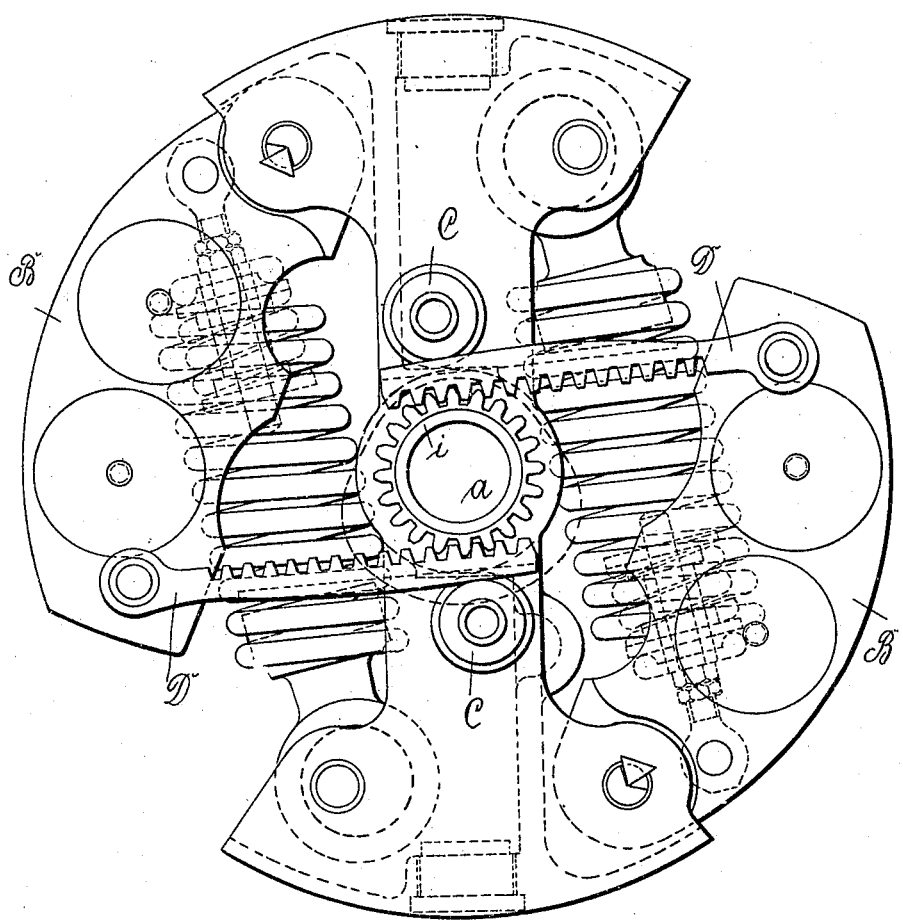

In the drawings, Figure 1 shows a four-stroke-cycle explosion engine provided with the new valve-gearing in vertical section. Figs. 2 and 3 show in elevation in two different positions a governor for controlling the valve-gearing. Figs. 4 to 14 show the various positions of the parts of the valve-gearing when the machine runs at full load, half load and unloaded, thus Figs. 4 to 8 show the various positions for the first alternative method of governing, and Figs. 9 to 13 the corresponding positions for the second method of governing. Fig. 14 shows the valve-gearing in one of its positions. Figs. 15 and 16 are indicator diagrams which show the two methods of governing.

The admission valve $x$ of the engine (Figs. 1 and 14) bears a piston valve $y$, the slots $z$ of which, during the downward motion of the main admission valve and the piston-valve, uncover ports for gas and air in the valve seat $v$.

The admission valve $x$, through which the explosive mixture enters, is moved by a two-armed lever, the arms of which are designated by the reference letters $c'$, $c^2$. The upper point of contact of the arm $c'$ with the valve has an adjustable spring arrangement $g$, in order to neutralize any inequalities there may be in the operation of the valve gearing. A second spring $f$ assists the closing of the valve as it tends to press the valve upward. The arm $c^2$ is connected by a rod $q$ with a controlling lever $t$, which receives an oscillating motion at the point A during the suction period only. This motion is produced by the roller $o$ on the lever $w$ and by a cam $k$ keyed on the auxiliary or countershaft $b$, in which arrangement the spring $e$ provides for continuous contact of the roller $o$ with the cam $k$.

Since the countershaft $b$, which is positively driven by gear-wheels $m$, $n$, from the side or way shaft $a$, only rotates at half the speed of the side or way shaft and the crankshaft, it is clear that the controlling lever $t$ with the lever $w$ and roller $o$ can only be caused to oscillate during the suction period if the cam $k$ be suitably formed and adjusted.

On the side or way shaft $a$ is mounted a shaft governor (Figs. 2 and 3), by the weights B of which a hollow shaft or sleeve $i$ with a gear wheel E can be turned through an angle of approximately 140° relatively to the shaft $a$ by means of racks D, D and guide rollers C, C. This hollow shaft or sleeve $i$ bears the actuating cam $d$ (Figs. 1 and 14) which, by means of the rollers $r'$ and $r^2$, positively drives an intermediate lever $s$, which bears the cams 5, 6, 7 and 8, 9, 10, in such a manner that, when the rollers $r'$ and $r^2$ lie on the circular arcs 1, 2 and 4, 3 of the cam $d$, which arcs are concentric with the shaft $a$, the intermediate lever $s$, notwithstanding the motion of $d$, remains stationary by reason of the concentric arcs; consequently the intermediate lever $s$ can take up two limiting positions, one toward the cylinder, as for example in Figs. 4, 6, 8, 10, 12, 13, and one toward the side or way shaft $a$, as in Figs. 7 and 11.

The transition of the intermediate lever $s$ from one limiting position to the other, takes place by means of the parts 4, 1 and 2, 3 of the cam $d$. Such positions of transition are given in Figs. 5 and 9. In the position shown in Fig. 14, where the intermediate lever $s$ takes up the limiting position toward the cylinder, when the cam $k$ is in operation, the rollers $u'$ and $u^2$ move on the cams 6, 7 and 9, 10 of $s$, whereby the valve $x$ is opened. If, on the other hand, the intermediate lever $s$ takes up the limiting position toward the side or way shaft, the rollers $u'$, $u^2$ move, when the cam $k$ is in operation, on the cams 5, 6 and 8, 9 of the intermediate lever $s$ and the valve $x$ remains closed during the upward oscillation of the bent lever $w$.

Figure 4:
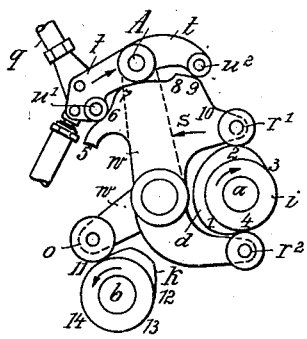
Figure 5:
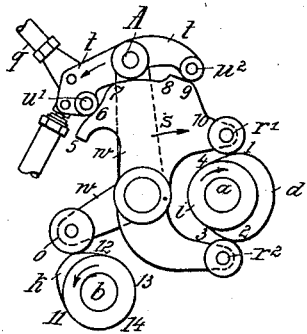
Figure 6:
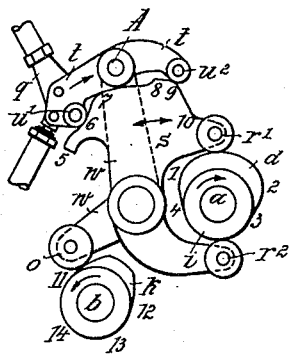
Figure 7:
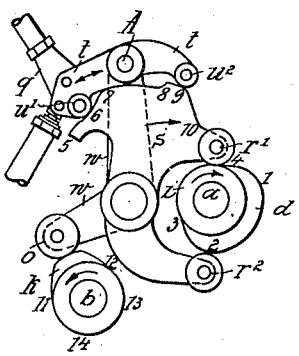
Figure 8:
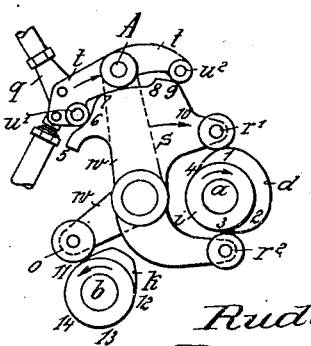
Figure 9:
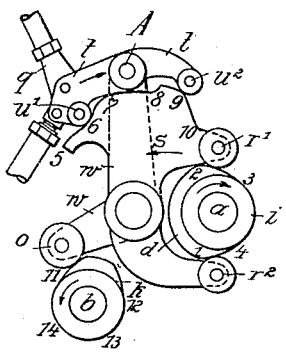

For the first method of governing, Figs. 4, 6 and 8 show the positions of the lower parts of the valve gearing relatively to each other at full load, half load and unloaded for the opening of the valve. The difference between Figs. 4, 6 and 8 lies only in the different positions of the governor cam $d$. It will be clearly seen that the opening of the valve must be constant, on account of the similar position of the parts $k$, $o$, $w$, A, $s$ of the gearing. The cam $k$ is rising. Fig. 5 shows the position of the parts of the valve gearing during the closing of the valve, for full load and Fig. 7 shows the same position of said parts at half load. Fig. 8 shows at the same time the closure of the valve when the load is thrown off; the different closures of the valve can be seen from the positions of the cam $k$ in Figs 5, 7 and 8. Cam $d$ governs forward.

Figure 10:
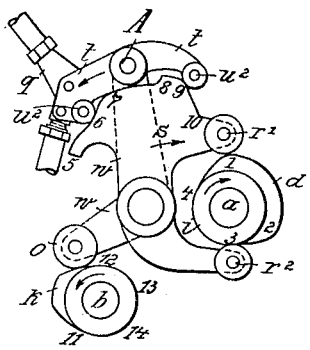
Figure 11:
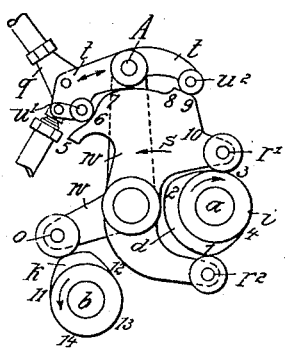
Figure 12:
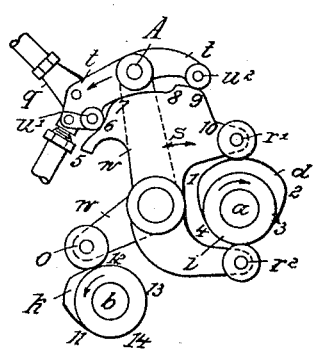
Figure 13:
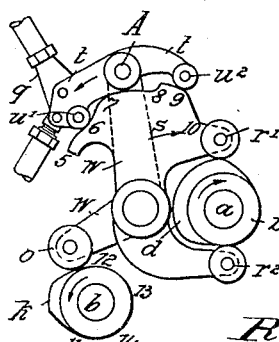

For the second method of governing, Figs. 10, 12 and 13 show the positions of the lower parts of the valve gearing relatively to each other at full load, half load and unloaded, for the closure of the valve. The difference between Figs. 10, 12 and 13 lies only in the different positions of the governor cam $d$. The cam $k$ is moving down. The closure of the valve is constant. As can be seen from the position of the cam $k$ in Figs. 9, 11 and 13, the opening of the valve is variable. The governor cam $d$ governs backward, as can be seen from a comparison of Figs. 9, 11 and 13.

For the purpose of permitting exact control of the valve, the parts 11, 12 and 13 of the cam $k$ and the parts 1, 2, 3 and 4 of the cam $d$ must be made of suitable form. The spring $e$ can also be replaced by mechanism which moves the lever $w$ positively.

This valve gearing is also suitable for steam engines, compressors, etc. The countershaft $b$ then turns at the same speed as the side or way shaft $a$ or several cams $k$ are provided. Instead of the valve $q$ and the piston-valve $y$, the known steam engine valves are employed.

What I claim is:

1. In a fluid-pressure engine, the combination of a cylinder, an inlet-valve for controlling the admission of fluid to said cylinder, a governor, a side or way-shaft driving said governor, a governor-cam arranged on said side-shaft and movable relatively to said shaft by said governor, a countershaft driven from said side shaft a lever oscillated by said governor-cam and bearing cam-surfaces, a second lever, a cam rotated from said countershaft and serving to oscillate said second lever, an actuating lever pivotally mounted on said second lever and engaging said cam surfaces on said first or cam-lever, and mechanism connecting said actuating lever with said inlet-valve.

2. Valve-gearing comprising a side- or way-shaft, a governor on said side-shaft, a cam mounted on said side-shaft and movable relatively to said side-shaft and by said governor, an intermediate lever having camways formed thereon and moved by said cam, a bent lever coaxial with said intermediate lever, an actuating lever pivotally mounted on said bent lever and sliding on the camways of said intermediate lever, a countershaft, gearing for driving said countershaft at half the speed of said side shaft, a tappet mounted on said countershaft and acting on said bent lever, an admission-valve, a link connecting said actuating lever and said admission-valve, the said link produced extending substantially toward the common axis of said intermediate and bent levers.

3. Valve-gearing comprising a side- or way-shaft, a governor on said side-shaft, racks pivotally connected to the weights of said governor, a hollow shaft rotatable on said side-shaft, a gear-wheel mounted on said hollow shaft and gearing with said racks, guide-rollers for said racks, a cam mounted on said hollow shaft, an intermediate lever having camways formed thereon and moved by said cam, a bent lever coaxial with said intermediate lever, an actuating lever pivotally mounted on said bent lever and sliding on the camways of said intermediate lever, a countershaft, gearing for driving said countershaft at half the speed of said side shaft, a cam mounted on said countershaft and acting on said bent lever, an admission-valve, a link connecting said actuating lever and said admission-valve.

In testimony whereof I have hereunto set my hand in presence of two subscribing witnesses.

RUDOLF HENNIG.

Witnesses:
MICHAEL ZIMMERMANN,
FRIEDRICH SCHAEDLER.